(12) United States Patent
Matsunaga et al.

(10) Patent No.: US 12,445,747 B2
(45) Date of Patent: Oct. 14, 2025

(54) PHOTO VOLTAIC IMAGE SENSOR TO SUPRESS BLACK SOLAR

(71) Applicant: OmniVision Technologies Inc., Santa Clara, CA (US)

(72) Inventors: Yoshiyuki Matsunaga, Kyoto (JP); Keiji Mabuchi, Cupertino, CA (US); Lindsay Grant, Campbell, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 293 days.

(21) Appl. No.: 18/471,466

(22) Filed: Sep. 21, 2023

(65) Prior Publication Data

US 2025/0106533 A1    Mar. 27, 2025

(51) Int. Cl.
*H04N 25/616* (2023.01)
*H04N 25/65* (2023.01)
*H04N 25/771* (2023.01)
*H04N 25/78* (2023.01)

(52) U.S. Cl.
CPC ........... *H04N 25/616* (2023.01); *H04N 25/65* (2023.01); *H04N 25/771* (2023.01); *H04N 25/78* (2023.01)

(58) Field of Classification Search
CPC .... H04N 25/616; H04N 25/65; H04N 25/771; H04N 25/78; H04N 25/70
See application file for complete search history.

(56) References Cited

U.S. PATENT DOCUMENTS

| | | | |
|---|---|---|---|
| 8,054,357 B2 * | 11/2011 | Tay | H04N 25/46 348/297 |
| 11,206,367 B1 * | 12/2021 | Shim | H04N 25/532 |
| 2003/0193699 A1 * | 10/2003 | Tay | H04N 25/46 348/E9.037 |
| 2021/0084243 A1 | 3/2021 | Ni | |
| 2021/0400214 A1 * | 12/2021 | Shim | H04N 25/77 |

* cited by examiner

*Primary Examiner* — Nicholas G Giles (57) ABSTRACT

A pixel of an image sensor includes a photodiode, a reset transistor, a peak hold transistor, and a first capacitor and a second capacitor. The pixels include, a first mode in which the noise and image output voltages of the photodiode are held in the first and second capacitors, respectively, and a second mode in which the output voltage of the photodiode in a state where the reset transistor is turned on to reset the photodiode is held in the first capacitor or the second capacitor. In the first mode, an image signal corresponding to the light incident amount of the photodiode and a noise signal when the light incident amount is relatively low are obtained. In the second mode, a noise signal when the light incident amount of the photodiode is relatively high is obtained.

7 Claims, 13 Drawing Sheets

PHOTO VOLTAIC IMAGE SENSOR TO SUPRESS BLACK SOLAR

TECHNICAL FIELD

The present disclosure generally relates to an image sensor removing a noise signal.

BACKGROUND INFORMATION

An image sensor includes a photodiode in each of pixel circuits, and detects a charge amount generated based on light entering each of the photodiodes.

Figure 1:
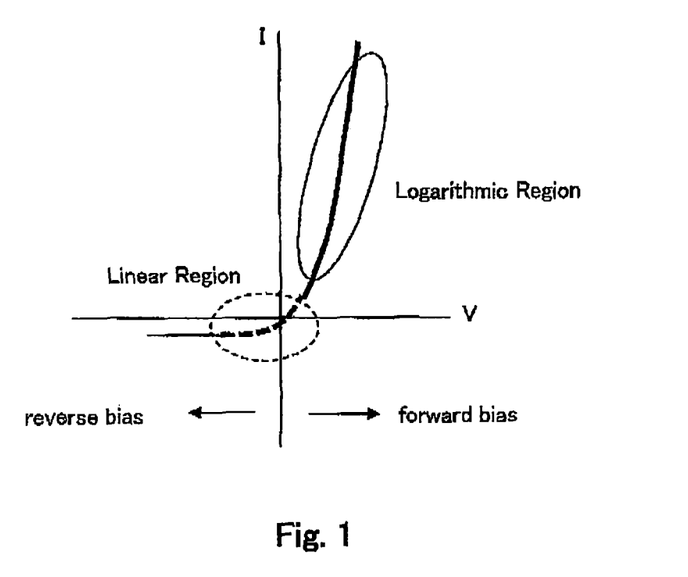
FIG. 1 is a diagram illustrating VI characteristics of a photodiode.

FIG. 1 is a diagram illustrating VI characteristics of one photodiode. As illustrated, the VI characteristics of the photodiode have a logarithmic region (at high illuminance) where the photodiode operates with a forward bias, and a linear region (at low illuminance) where the photodiode operates with a reverse bias and a part of the forward bias.

In the linear region where the photodiode operates under low luminance, thermal noise called kTC noise occurs. The kTC noise is noise caused by switching of a reset transistor resetting accumulated charges of the photodiode.

Figure 2:
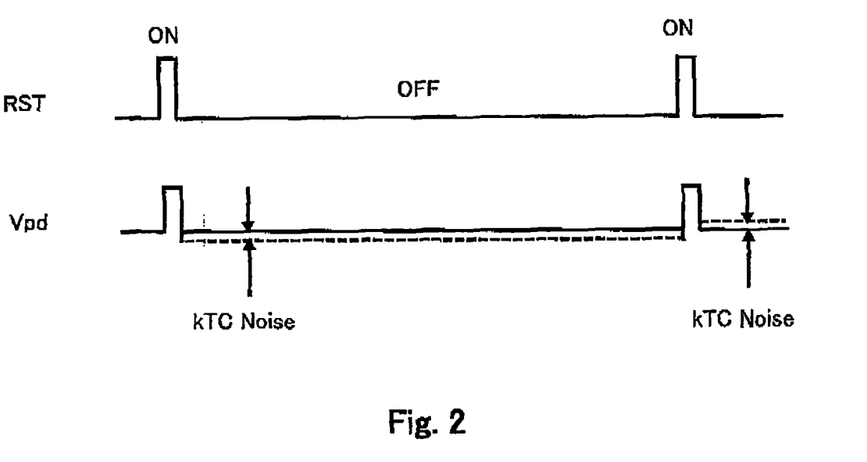
FIG. 2 is a diagram illustrating kTC noise.

FIG. 2 is a diagram illustrating the kTC noise. As illustrated, after reset, an offset shift appears in an output voltage Vpd of the photodiode. A direction of the shift is not fixed. Accordingly, the kTC noise deteriorates quality of a reproduced image. Note that FIG. 2 illustrates a case with no light incidence.

The kTC noise is desirably removed from an output of the image sensor.

An example has disclosed integration of the output of the photodiode in order to remove flicker caused by LED lighting, although without the discussion of the kTC noise.

SUMMARY

An image sensor according to the present disclosure is an image sensor including a plurality of pixels. Each of the pixels includes a photodiode configured to generate an output voltage corresponding to a light incident amount, a reset transistor configured to reset the photodiode by supplying a reset voltage to the photodiode, a peak hold transistor that includes a control end connected to the photodiode and the reset transistor and is configured to allow a current corresponding to the output voltage of the photodiode or the reset voltage to flow through the peak hold transistor, and a first capacitor and a second capacitor each configured to hold the voltage supplied from the peak hold transistor. Each of the pixels includes, as operation modes, a first mode in which the output voltage of the photodiode immediately after the reset transistor is turned on to reset the photodiode is held in the first capacitor, and the output voltage of the photodiode after the photodiode is reset and a predetermined signal integration period ends is held in the second capacitor, and a second mode in which the output voltage of the photodiode in a state where the reset transistor is turned on to reset the photodiode is held in the first capacitor or the second capacitor. In the first mode, an image signal corresponding to the light incident amount of the photodiode and a noise signal when the light incident amount is relatively low are obtained. In the second mode, a noise signal when the light incident amount of the photodiode is relatively high is obtained.

According to the image sensor of the present disclosure, the noise may be appropriately removed even when the light incident amount is relatively low and even when the light incident amount is relatively high.

BRIEF DESCRIPTION OF THE DRAWINGS

Embodiments of the present disclosure will be described based on the following figures, wherein.

DESCRIPTION OF EMBODIMENTS

An embodiment of the present disclosure is described below with reference to drawings. The following embodiment does not limit the present disclosure, and configurations obtained by selectively combining a plurality of illustrations are also included in the present disclosure.

Circuit Configuration

Figure 3:
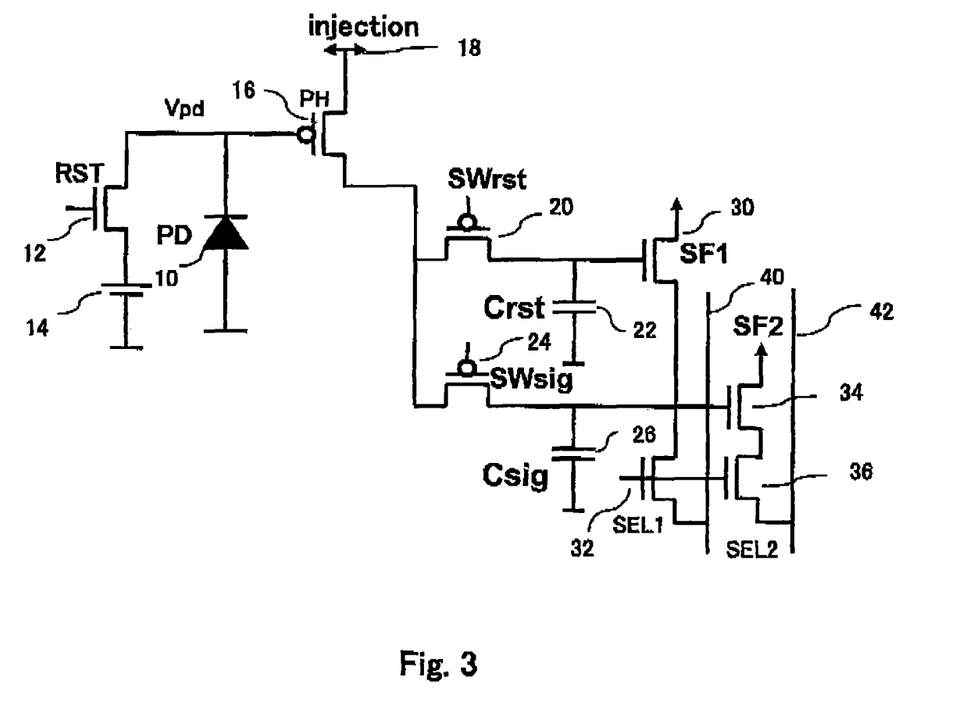
FIG. 3 is a diagram illustrating a configuration of a pixel circuit according to an embodiment.

FIG. 3 is a diagram illustrating a configuration of a pixel circuit according to the embodiment. A photodiode (PD) 10 accumulates charges (electrons in this case) based on incident light. A cathode of the photodiode (PD) 10 serves as an output end, and an anode is connected to a power supply (e.g., ground). In the present embodiment, a field-effect transistor (FET) is used as a transistor.

One end (drain) of a reset transistor (RST) 12 is connected to the cathode of the photodiode (PD) 10, and the other end (source) of the reset transistor (RST) 12 is connected to a power supply (e.g., ground) through a reset power supply 14. In this example, the reset transistor (RST) 12 is an n-channel transistor.

The cathode of the photodiode (PD) 10 is connected to a gate of a peak hold transistor (PH) 16. The peak hold transistor (PH) 16 is a p-channel transistor. A source of the peak hold transistor (PH) 16 is connected to an injection power supply 18. A source of a first switch transistor (SWrst)

20 and a source of a second switch transistor (SWsig) 24 are connected to a drain of the peak hold transistor (PH) 16. One end of a first capacitor (Crst) 22 is connected to a drain of the first switch transistor (SWrst) 20. One end of a second capacitor (Csig) 26 is connected to a drain of the second switch transistor (SWsig) 24. The other end of the first capacitor (Crst) 22 and the other end of the second capacitor (Csig) 26 are each connected to a power supply (e.g., ground). The first switch transistor (SWrst) 20 and the second switch transistor (SWsig) 24 are p-channel transistors.

The drain of the first switch transistor (SWrst) 20 is connected to a gate of a first source follower transistor (SF1) 30. A drain of the first source follower transistor (SF1) 30 is connected to a power supply, and a source of the first source follower transistor (SF1) 30 is connected to a drain of a first selection transistor (SEL1) 32. A source of the first selection transistor (SEL1) is connected to a first output line 40.

The drain of the second switch transistor (SWsig) 24 is connected to a gate of a second source follower transistor (SF2) 34. A drain of the second source follower transistor (SF2) 34 is connected to a power supply, and a source of the first source follower transistor (SF1) 30 is connected to a drain of a second selection transistor (SEL2) 36. A source of the second selection transistor (SEL2) 36 is connected to a second output line 42.

A gate of the first selection transistor (SEL1) 32 and a gate of the second selection transistor (SEL2) 36 are connected in common, and are supplied with a row selection signal. When the row selection signal becomes a Hi level, a signal corresponding to a gate voltage of the first source follower transistor (SF1) 30 is output to the first output line 40, and a signal corresponding to a gate voltage of the second source follower transistor (SF2) 34 is output to the second output line 42.

The source follower transistors (SF1 and SF2) 30 and 34 and the selection transistors (SEL1 and SEL2) 32 and 36 are n-channel transistors. Note that the source follower transistors (SF) are referred to as output transistors, the first source follower transistor (SF1) 30 is referred to as a first output transistor, the second source follower transistor (SF2) 34 is referred to as a second output transistor, and the gates thereof are referred to as control ends.

As described above, the pixel circuit includes the two switch transistors (SWrst and SWsig) 20 and 24 and the two capacitors (Crst and Csig) 22 and 26. The first capacitor (Crst) 22 accumulates only kTC noise immediately after reset, and the second capacitor (Csig) 26 accumulates an image signal and the kTC noise (S+N) of one frame period. Further, noise (N) is output from the first capacitor (Crst) 22 to the first output line 40, and the image signal+noise (S+N) is output from the second capacitor (Csig) 26 to the second output line 42. These two output signals are supplied to a circuit (e.g., analog-to-digital converter) outside the pixel, the circuit performs subtraction to remove the kTC noise (N) from the output signal of the second capacitor (Csig) 26 (S+N−N=S).

Figure 4:
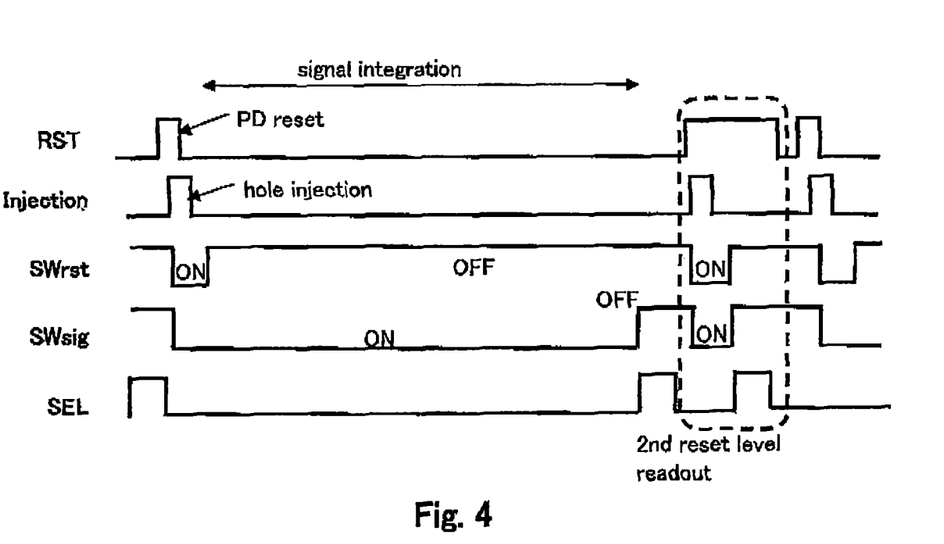
FIG. 4 is a timing chart illustrating operation of the circuit according to the present embodiment illustrated in FIG. 3.

FIG. 4 is a timing chart illustrating operation of the circuit according to the present embodiment illustrated in FIG. 3. The reset transistor (RST) 12 is turned on to reset the photodiode (PD) 10. Further, an injection voltage is output (is set to Hi level) from the injection power supply 18 while the first switch transistor (SWrst) 20 and the second switch transistor (SWsig) 24 are turned on, to inject charges (holes) into the first capacitor (Crst) 22 and the second capacitor (Csig) 26 through the peak hold transistor (PH) 16.

Next, the injection power supply 18 is returned to a Lo level to stop injection of the holes. At this time, excess injected holes are discharged to the injection power supply 18 through the peak hold transistor (PH) 16 by keeping the first and second switch transistors (SWrst and SWsig) 20 and 24 on.

Next, the first switch transistor (SWrst) is turned off to cause the first capacitor (Crst) 22 to hold the voltage immediately after the reset, namely, the noise (N) not including the image signal at the reset. The operation mode is called a first mode.

After a signal integration period (exposure period) elapses, the second switch transistor (SWsig) 24 is turned off to end accumulation of the signal. The image signal corresponding to the light incident amount in the signal integration period is accumulated in the second capacitor (Csig) 26. The accumulated charges of the second switch transistor (SWsig) also include the noise at the reset. Therefore, after the signal integration period elapses, the second capacitor (Csig) holds the image signal+noise (S+N).

Next, the first and second selection transistors (SEL1 and SEL2) 32 and 36 are turned on by SEL (FIG. 4) to output the noise (N) accumulated in the first capacitor (Crst) 22 and the image signal+noise (S+N) accumulated in the second capacitor (Csig) 26 to the output lines 40 and 42 through the source follower transistors (SF1 and SF2) 30 and 34, respectively.

Since the noise (N) and the image signal+noise (S+N) are transferred to the output lines 40 and 42 in the above-described manner, the image signal from which the noise is removed is obtained by performing subtraction in an external signal processing circuit (S+N−N=S).

The injection of the holes may be performed while the reset transistor (RST) 12 is turned on or after the reset transistor (RST) 12 is turned off.

In the case where readout of such two signals ends, the reset transistor (RST) 12 is turned on to reset the photodiode (PD) 10. In the reset state, the injection voltage is output (is set to H level) from the injection power supply 18 while the first switch transistor (SWrst) 20 and the second switch transistor (SWsig) 24 are turned on, to inject the holes to the first capacitor (Crst) 22 and the second capacitor (Csig) 26 through the peak hold transistor (PH) 16.

Next, the injection power supply 18 is returned to the L level to stop the injection of the holes. At this time, excess injected holes are discharged to the injection power supply 18 through the peak hold transistor (PH) 16 by keeping the first and second switch transistors (SWrst and SWsig) 20 and 24 on.

After the injection/discharge of the holes by the injection voltage ends, and the first switch transistor (SWrst) 20 and the second switch transistor (SWsig) 24 are turned off, the first and second selection transistors (SEL1 and SEL2) 32 and 36 are turned on by SEL while the reset state of the photodiode (PD) 10 is maintained, to output the voltages of the first capacitor (Crst) 22 and the second capacitor (Csig) 26 in the hole injection state to the output lines 40 and 42 through the source follower transistors (SF1 and SF2) 30 and 34, respectively.

In the second output, the reset transistor (RST) is kept on. Therefore, the photodiode (PD) 10 is in the reset state. Accordingly, the voltage corresponding to the hole injection state is held in each of the first capacitor (Crst) 22 and the second capacitor (Csig) 26. Thus, the noise in the hole injection state, not related to the light incident amount of the photodiode (PD) 10, is detected. Such noise in the charge hole injection state are denoted by N Log 1 and N Log 2. The operation mode is called a second mode.

The voltage held by the first capacitor (Crst) 22 is output from the first source follower transistor (SF1) 30, and the voltage held by the second capacitor (Csig) 26 is output from the second source follower transistor (SF2) 34. Accordingly, a difference between the signal read out from the first output line 40 and the signal read out from the second output line 42 corresponds to a difference of a threshold voltage (Vth) between the first source follower transistor (SF1) 30 and the second source follower transistor (SF2) 34.

As described above, in the present embodiment, in the first readout, the noise signal (N) immediately after the reset of the photodiode (PD) 10, held in the first capacitor (Crst) 22 is obtained in the first output line 40, and a sum (S+N) of the image signal and the noise signal, held in the second capacitor (Csig) 26 is obtained in the second output line 42.

In the second readout, the noise N Log 1 and N Log 2 in the charge injection state respectively held by the first capacitor (Crst) 22 and the second capacitor (Csig) 26 are obtained.

Figure 5:
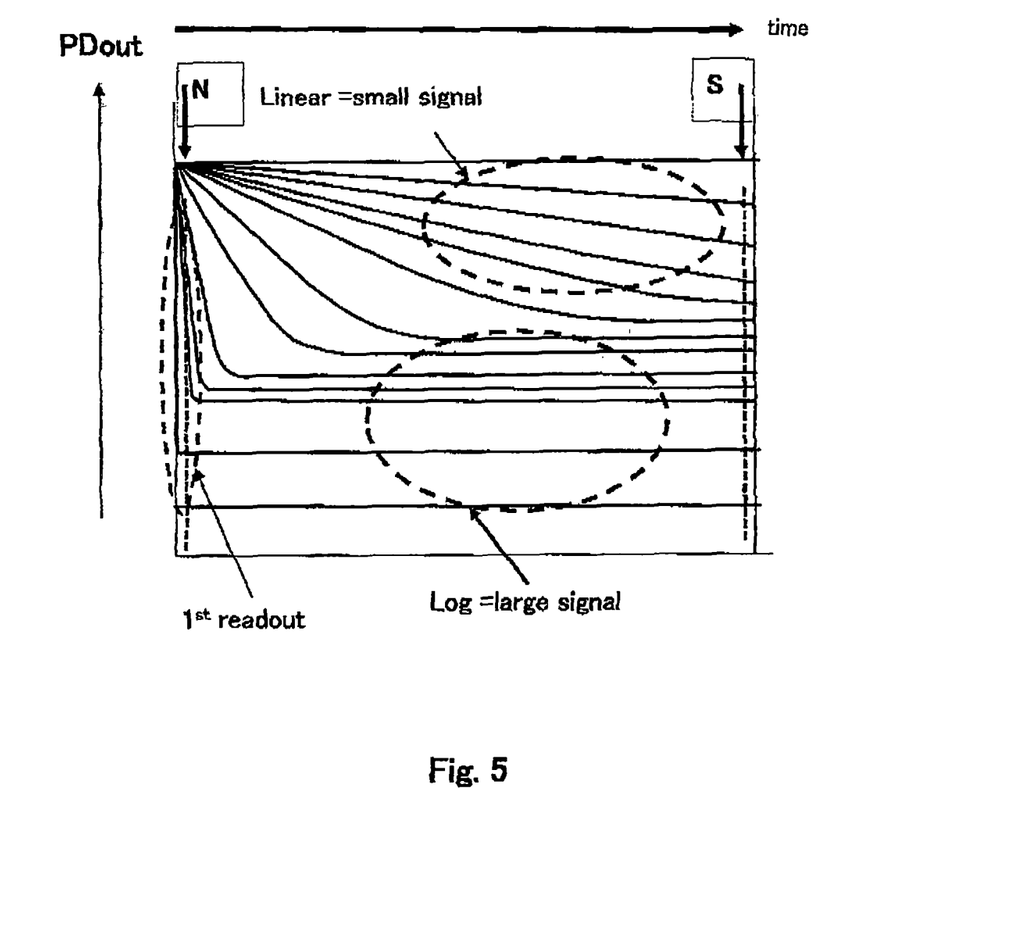
FIG. 5 is a diagram illustrating relationship between a light incident amount of a photodiode (PD) 10 and an output voltage PDout.

FIG. 5 illustrates relationship between the light incident amount of the photodiode (PD) 10 and an output voltage PDout. The relationship with the higher light incident amount is positioned on a lower side of the drawing. As illustrated, in a case where the light incident amount is small, the voltage is linearly varied. In contrast, when the light incident amount is increased, the voltage is logarithmically varied.

In the drawing, a position "N" indicates an acquisition timing of the noise in the first capacitor (Crst) 22 immediately after the reset. As illustrated, in a case where the light incident amount is extremely large, the light incident amount influences the output voltage even immediately after the reset.

Figure 6:
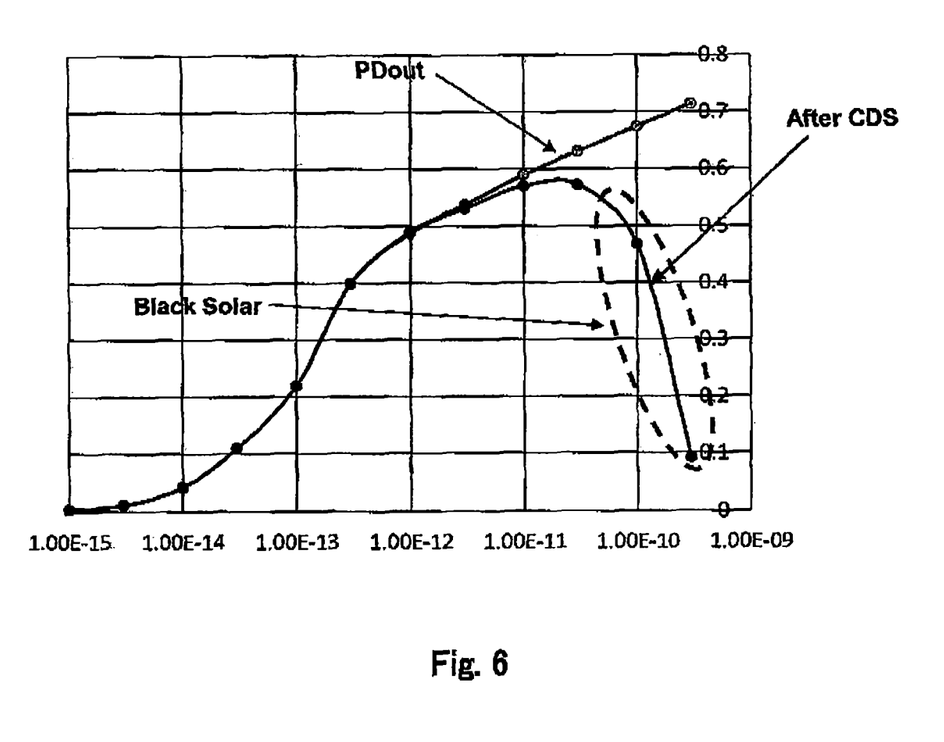
FIG. 6 is a diagram illustrating the output of the photodiode, and an output obtained by subtracting noise (N) from an image signal+noise (S+N) as two outputs in a first readout.

FIG. 6 is a diagram illustrating the output of the photodiode and an output obtained by subtracting the noise (N) from the image signal+noise (S+N) as the two outputs in the first readout. A lateral axis indicates the light incident amount. As illustrated, when the light incident amount is increased, the light incident amount influences the noise (N) to be subtracted. Therefore, the output in the case where the noise (N) is subtracted is reduced. This is called black solar.

In the present embodiment, the second readout is performed, and the noise signal detected at this time is a signal not influenced by light incidence. Accordingly, occurrence of the black solar can be prevented by using the noise signals (NLog) obtained in the second readout.

Further, in the first readout, the image signal+noise (S+N) is output from the second source follower transistor (SF2) 34. Therefore, as the noise signal obtained in the second readout, the noise signal N Log 2 output from the same second source follower transistor (SF2) 34 is preferably used.

In the case where the light incident amount is large, the noise signal N Log 2 of the second output line 42 in the second readout is subtracted from the image signal+noise (S+N) in the first readout. In other words, the image signal is calculated from S+N−N Log 2.

In the case where the light incident amount is small, the image signal is obtained by subtracting the noise signal N from the image signal+noise (S+N) in the first readout. The image signal+noise (S+N) in the first readout is read out from the second source follower transistor (SF2) 34, and the noise signal N is read out from the first source follower transistor (SF1). Therefore, a difference of the threshold voltage between the two source follower transistors (SF2 and SF1) 34 and 30 is overlapped as an error. On the other hand, in the second readout, an error N Log 2−N Log 1 by the difference of the threshold voltage (Vth) between the two source follower transistors (SF2 and SF1) 34 and 30 can be calculated. Accordingly, in the linear region where the light incident amount is low, S+N−N is preferably compensated for with the error N Log 2−N Log 1.

In other words, the image signal is preferably obtained from (S+N)−N+(N Log 2−N Log 1).

Configuration of Image Sensor

Figure 7:
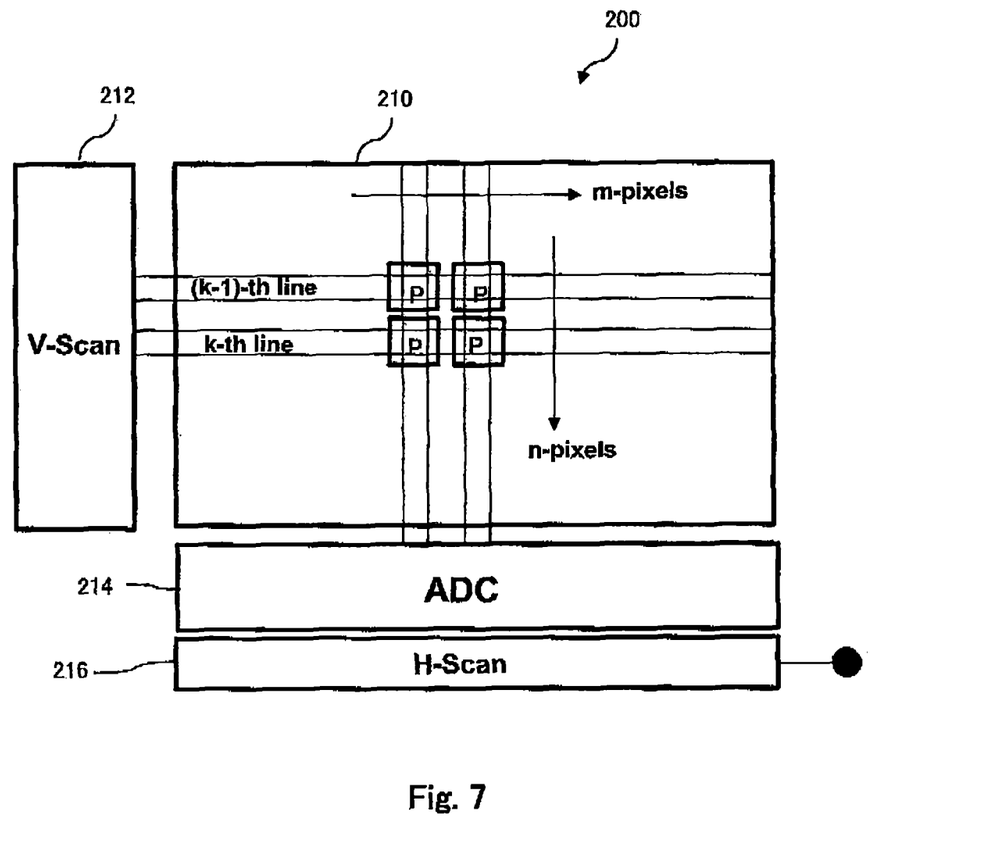
FIG. 7 is a diagram illustrating an image sensor 200 in which pixels according to the embodiment are two-dimensionally arranged.

FIG. 7 is a diagram illustrating an image sensor 200 in which the pixels according to the embodiment are two-dimensionally arranged. A pixel array 210 includes pixels P as described above arranged in m columns*n rows (m*n), namely, includes m pixels in a horizontal direction and n pixels in a vertical direction. A vertical scan circuit (V-Scan) 212 sequentially selects rows of the pixels P in the vertical direction. The pixels in each column are connected to an analog-to-digital converter (ADC) 214 by a readout line in the vertical direction. A horizontal scan circuit (H-Scan) 216 is connected to the analog-to-digital converter (ADC) 214, and image signals of the respective pixels are sequentially output from the horizontal scan circuit (H-Scan) 216.

Figure 8:
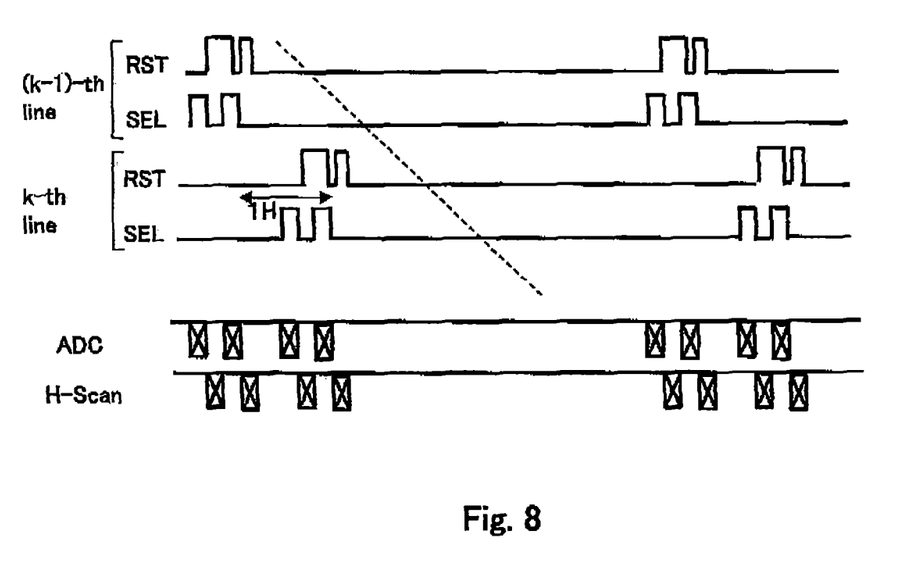
FIG. 8 is a timing chart illustrating operation of the image sensor 200.

FIG. 8 is a timing chart illustrating operation of the image sensor 200. Here, the injection pules, SWrst pulses and SWsig pulses in FIG. 4 are omitted.

In a (k−1)-th row (line), after two rounds of readout end, the reset transistor (RST) 12 is turned on to reset the photodiode (PD) 10. The reset is performed for each vertical period (1V) (frame period). Further, exposure starts after one reset. In addition, the first readout of the signals is performed shortly before next reset. After the first readout, the second readout in the reset state is performed. As described above, in each readout, the two selection transistors (SEL1 and SEL2) are turned on by SEL, and the above-described signals N and S+N are respectively read out to the output lines 40 and 42. The readout signals are supplied to the analog-to-digital converter (ADC) 214, and are converted into digital signals. In addition, as described above, different calculations are performed at high illuminance and at low illuminance, and the image signal is calculated.

The operation is simultaneously performed on the m pixels in one horizontal line. Thereafter, the horizontal scan circuit (H-scan) 216 sequentially outputs the digital signals of the m pixels.

Next, the same operation is performed on a k-th row (line) by shifting the horizontal period by 1H. Signals of all of the m*n pixels can be read out by repeating the operation n times.

As described above, the calculation to remove the noise can be performed by the ADC 214; however, the two signals may be output to outside from the image sensor 200, and an external circuit may remove the noise from the image signal+noise. Further, adoption of any of the noise removal calculation methods can be determined based on intensity of the image signal. For example, one threshold is provided for the intensity of the image signal. In a case where the intensity of the image signal is greater than or equal to the threshold, S−N Log 2 is adopted, and in a case where the intensity of the image signal is less than or equal to the threshold, (S+N)−N+(N Log 2−N Log 1) is adopted.

Modification 1

Figure 9:
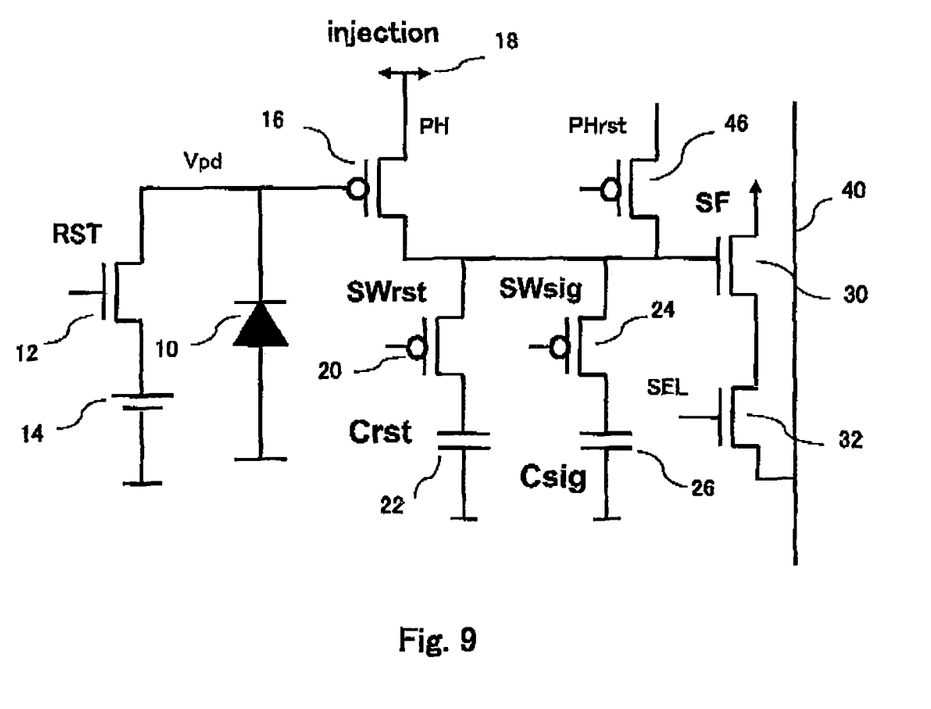
FIG. 9 is a diagram illustrating a circuit configuration according to a modification 1.

FIG. 9 is a diagram illustrating a circuit configuration according to a modification 1. In the modification 1, the signals of the two capacitors (Crst and Csig) 22 and 26 are read out using one source follower circuit (source follower transistor (SF) 30 and selection transistor (SEL) 32).

The source follower transistor (SF) 30 is connected to the drain of the peak hold transistor (PH) 16. In addition, the sources of both of the first switch transistor (SWrst) 20 and the second switch transistors (SWsig) 24 are connected to the drain of the peak hold transistor (PH) 16. The drain of the first switch transistor (SWrst) 20 is connected to a power supply (e.g., ground) through the first capacitor (Crst) 22, and the drain of the second switch transistor (SWsig) 24 is connected to a power supply (e.g., ground) through the second capacitor (Csig) 26.

Further, a peak hold reset transistor (PHrst) 46 is connected to the drain of the peak hold transistor (PH) 16. When the peak hold reset transistor (PHrst) 46 is turned on, the gate of the source follower transistor (SF) 30 can be reset by a peak hold reset voltage.

Figure 10:
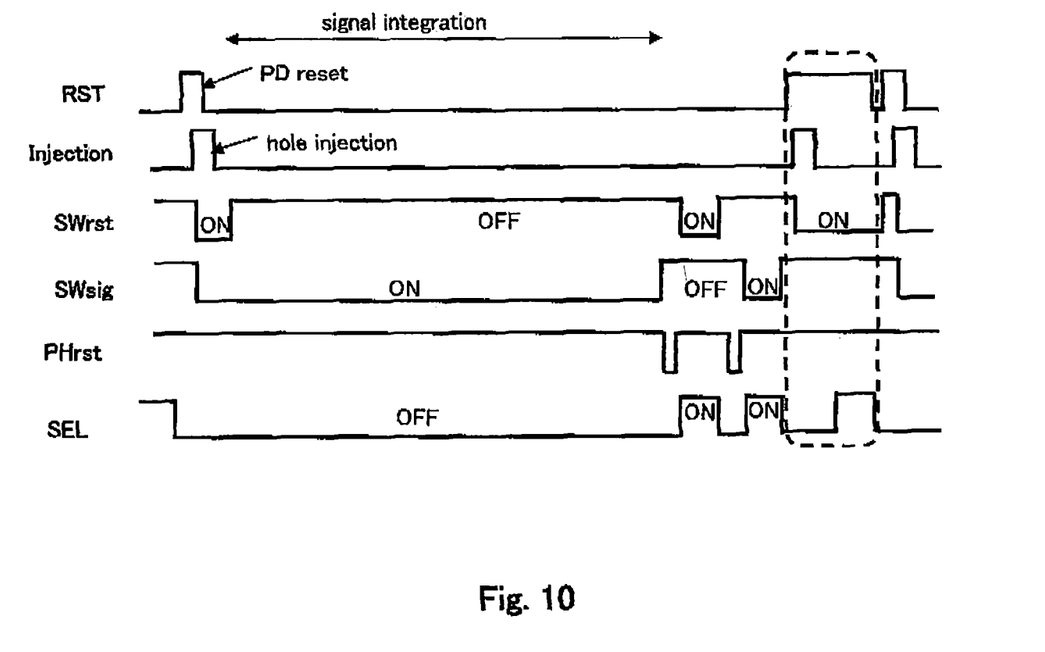
FIG. 10 is a timing chart illustrating operation according to the modification 1.

FIG. 10 is a timing chart illustrating operation according to the modification 1. After the reset transistor (RST) 12 is turned on to reset the photodiode (PD) 10, the switch transistors (SWrst and SWsig) 20 and 24 are turned on, and the injection power supply 18 is turned on for a short period. As a result, the holes are injected into the two capacitors (Crst and Csig) 22 and 26 through the peak hold transistor (PH) 16, and excess holes are removed by leakage of the peak hold transistor (PH) 16.

Next, the first switch transistor (SWrst) 20 is turned off to cause the first capacitor (Crst) 22 to hold the noise (N).

After the signal integration period ends, the second switch transistor (SWsig) is turned off to cause the second capacitor (Csig) to hold the image signal+noise (S+N).

After the peak hold reset transistor (PHrst) 46 is turned on to reset the gate of the source follower transistor (SF) 30, the peak hold reset transistor (PHrst) 46 is turned off, and the first switch transistor (SWrst) is turned on. In this state, the selection transistor (SEL) 32 is turned on to read out the noise to the output line 40.

Thereafter, after the peak hold reset transistor (PHrst) is turned on for a short period, to reset the gate of the source follower transistor (SF) 30, the second switch transistor (SWsig) and the selection transistor (SEL) 32 are turned on to read out the image signal+noise (S+N).

In a case where the first readout ends in the above-described manner, the second readout is performed. The second readout is a readout of the noise signal not related to light incidence. The reset transistor (RST) 12 is turned on to reset the photodiode (PD) 10. In the reset state, the first switch transistor (SWrst) 20 is turned on, and the injection voltage is output (is set to H level) from the injection power supply 18 to inject the holes to the first capacitor (Crst) 22 through the peak hold transistor (PH) 16.

After the injection of the holes by the injection voltage ends and the first switch transistor (SWrst) 20 is turned on, the selection transistor (SEL) 32 is turned on while the reset state of the photodiode (PD) 10 is maintained, to output the voltage of the first capacitor (Crst) 22 in the hole injection state to the output line 40 through the source follower transistor (SF) 30.

As described above, the noise (N) and the image signal+noise (S+N) in the first readout, and the noise signal NLog in the second readout can be read out to the corresponding output line 40 through the one source follower transistor (SF) 30.

Modification 2

Figure 11:
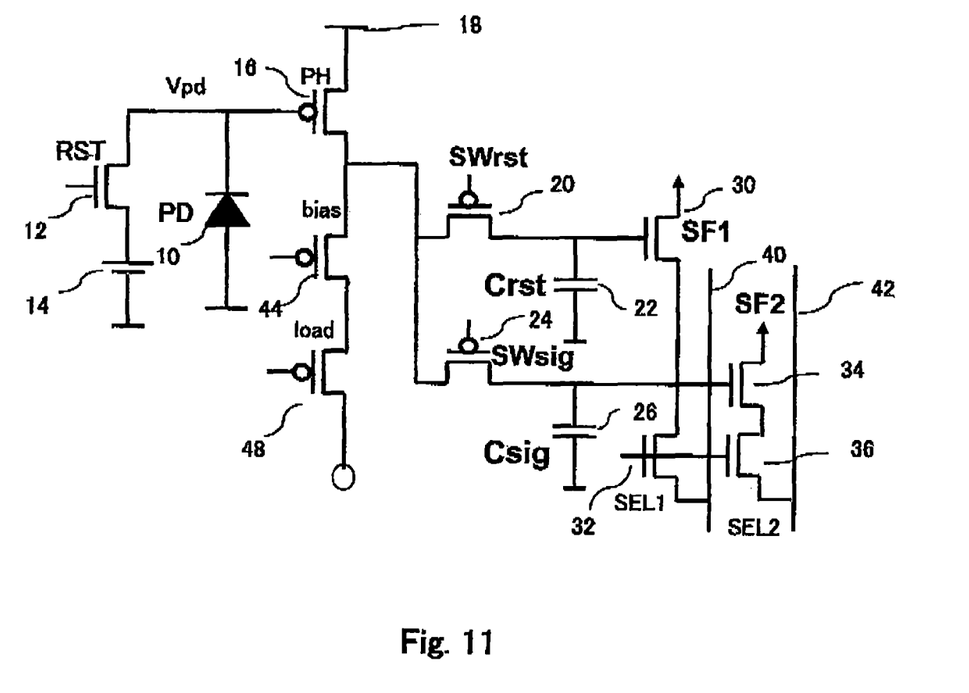
FIG. 11 is a diagram illustrating a configuration according to a modification 2.

FIG. 11 is a diagram illustrating a configuration according to a modification 2. In the modification 2, as compared with the configuration in FIG. 3, a bias transistor (bias) 44 and a load transistor (load) 48 are added. In other words, the drain of the peak hold transistor (PH) 16 is connected to a power supply (e.g., ground) through the bias transistor (bias) 44 and the load transistor (load) 48. The bias transistor (bias) 44 and the load transistor (load) 48 are p-channel transistors.

A gate voltage of the load transistor (load) 48 is set to a direct-current voltage at which peak hold transistor (PH) 16 performs source follower operation. Further, to inject the holes to the two capacitors (Crst and Csig) 22 and 26, a positive pulse is applied to the drain of the peak hold transistor (PH) 16 in the circuit of FIG. 3; however, in the modification 2, a negative pulse is applied to the bias transistor (bias) 44.

Figure 12:
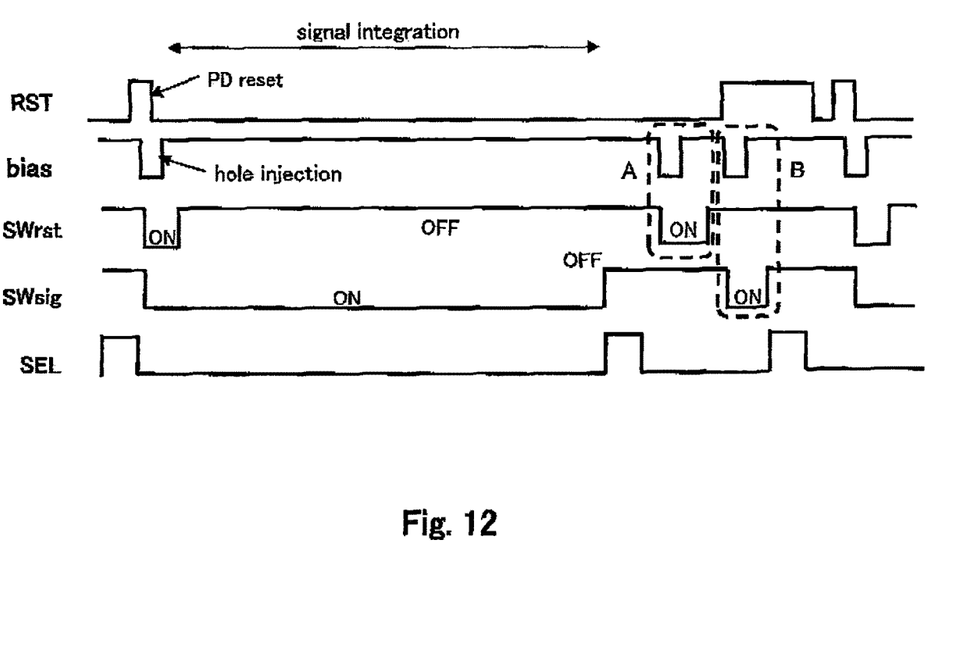
FIG. 12 is a timing chart illustrating operation according to the modification 2.

FIG. 12 is a timing chart illustrating operation according to the modification 2. As in the configuration in FIG. 3, after the image signal+noise (S+N) is read out, only the switch transistor (SWrst) 20 is turned on (timing A). Further, the bias transistor (bias) is turned on/off during the period to inject and discharge the holes into/from the first capacitor (Crst) 22. The hole injection and discharge operation is called refresh operation of the peak hold circuit. After the switch transistor (SWrst) 20 is turned off, namely, after the refresh operation, a signal Slin+N corresponding to the signal accumulated in the photodiode (PD) 10 is accumulated in the first capacitor (Crst) 22. The operation mode is called a fourth mode.

Next, in a state where only the second switch transistor (SWsig) 24 is turned on and the reset transistor (RST) 12 is turned on, the holes are injected into and discharged from the second capacitor (Csig) 26. Thereafter, the second switch transistor (SWsig) is turned off to accumulate the noise NLog in the second capacitor (Csig) 26 (timing B). The operation mode is called a third mode.

Thereafter, when the selection transistors (SEL1 and SEL2) are turned on by SEL, the signal Slin+N and the noise NLog are read out to the output lines 40 and 42.

In the modification 2, the signal S+N and the noise NLog in the logarithmic region are read out from the source follower transistor (SF2) 34. Accordingly, S+N−NLog is calculated by an external circuit. Since the signal S+N and the noise NLog are read out from the same source follower transistor (SF2), influence of variation of the threshold voltage Vth for the source follower transistor (SF2) 34 is suppressed. Further, the noise N and the signal Slin in the linear region read out from the source follower transistor (SF1) 30 is read out from the pixel, and calculation of Slin-N is performed. The calculation is also calculated for the signals read out from the same source follower transistor (SF2) 34, and influence of variation of the threshold voltage Vth for the source follower transistor (SF2) 34 is suppressed.

Figure 13:
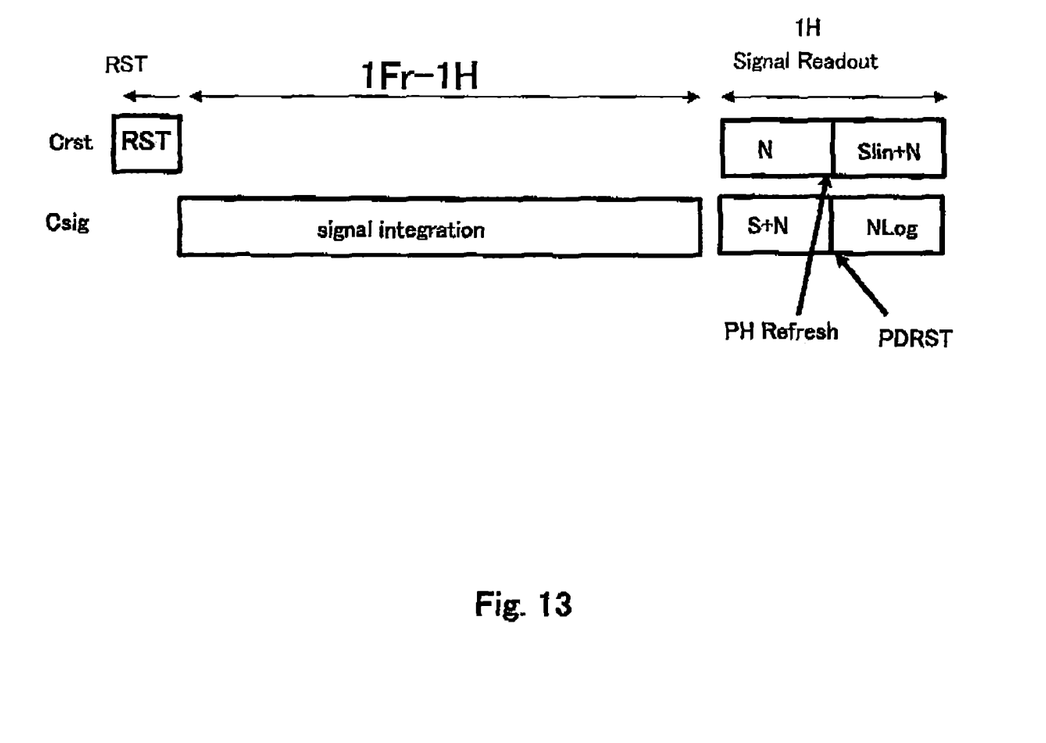
FIG. 13 is a diagram illustrating the operation according to the modification 2.

FIG. 13 is a diagram illustrating operation according to the modification 2. First, the holes are injected into the capacitors (Crst and Csig), the photodiode (PD) is reset by the reset transistor 12, and the noise at the reset is held in the first capacitor (Crst) 22. On the other hand, the signal corresponding to the charges generated in the photodiode (PD) is accumulated in the second capacitor (Csig) 26. The signal integration period is set to a period obtained by subtracting one horizontal period 1H from one frame period (1Fr−1H). Note that one frame period corresponds to 1V (vertical period). During one horizontal period 1H, readout is performed twice. The operation is performed on each of the horizontal lines while the period is shifted by 1H to output an image signal for one frame.

Effects by Embodiment

Figure 14:
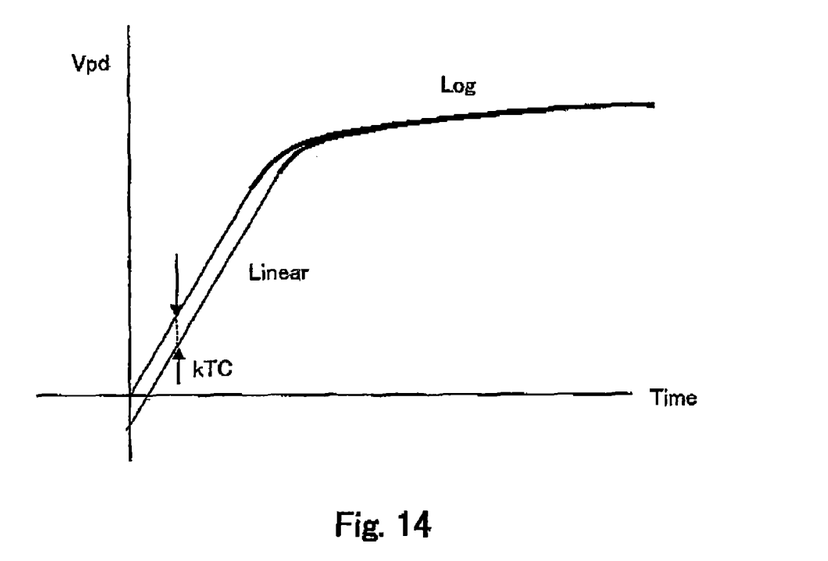
FIG. 14 is a diagram illustrating a temporal change of a charge accumulation state of the photodiode (PD) 10.

FIG. 14 is a diagram illustrating a temporal change of the charge accumulation state of the photodiode (PD) 10. As illustrated, the voltage is linearly varied at first, but is logarithmically varied from the middle. The kTC noise is present in a linear region, but is not present in a Log region. In other words, the characteristics in the Log region are determined by a PN junction built-in voltage of the photodiode (PD) 10, and are hardly varied among the pixels.

Figure 15:
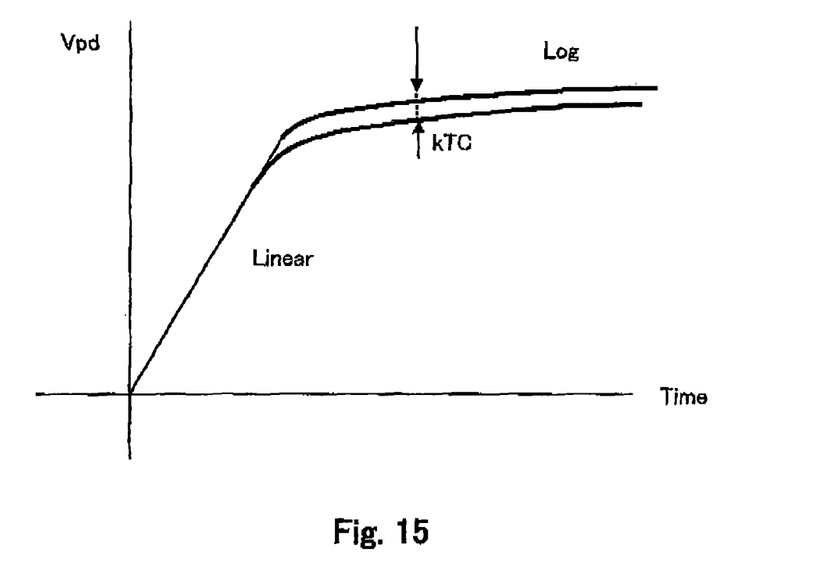
FIG. 15 is a diagram illustrating a state where the kTC noise is subtracted from a signal S+N.

Accordingly, as illustrated in FIG. 15, when the kTC noise N is subtracted from the signal S+N obtained in the first calculation, the kTC noise in the Linear region disappears, but the kTC noise appears in the Log region.

In the present embodiment, calculation of S+N(kTC noise)−N(kTC noise) is performed in the region where the light incident amount is low, and calculation of S−NLog is performed in the region where the light incident amount is high.

The black solar occurs in the region where the incident light is strong. Therefore, NLog is preferably subtracted from the signal S only in the region where the black solar occurs. In this case, the noise N is subtracted from the signal S in the linear region (Slin), and the noise NLog is subtracted from the signal S in the logarithmic region. As a result, the kTC noise is suppressed in the entire region. As described above, RST noise caused by a capacity Cg (Cgd of NMOS 12, the RST transistor) between a gate electrode of the RST transistor and the PD is similarly suppressed.

What is claimed is:

1. An image sensor including a plurality of pixels, wherein
   each of the pixels includes:
      a photodiode configured to generate an output voltage corresponding to a light incident amount;
      a reset transistor configured to reset the photodiode by supplying a reset voltage to the photodiode;
      a peak hold transistor that includes a control end connected to the photodiode and the reset transistor, and is configured to allow a current corresponding to the output voltage of the photodiode or the reset voltage to flow through the peak hold transistor; and
      a first capacitor and a second capacitor each configured to hold the current supplied from the peak hold transistor,
   each of the pixels includes, as operation modes:
      a first mode in which the output voltage of the photodiode immediately after the reset transistor is turned on to reset the photodiode is held in the first capacitor, and the output voltage of the photodiode after the photodiode is reset and a predetermined signal integration period ends is held in the second capacitor; and
      a second mode in which the output voltage of the photodiode in a state where the reset transistor is turned on to reset the photodiode is held in the first capacitor or the second capacitor,
   in the first mode, an image signal corresponding to the light incident amount of the photodiode and a noise signal when the light incident amount is relatively low are obtained, and
   in the second mode, a noise signal when the light incident amount of the photodiode is relatively high is obtained.

2. The image sensor according to claim 1, wherein
   in the first mode, in the first capacitor, a noise signal immediately after the photodiode is reset is obtained, and
   in the second mode, in the first capacitor or the second capacitor, a noise signal when the photodiode is reset after the signal integration period is obtained.

3. The image sensor according to claim 2, wherein each of the pixels further includes:
      a first source follower transistor configured to output the voltage held by the first capacitor; and
      a second source follower transistor configured to output the voltage held by the second capacitor.

4. The image sensor according to claim 3, wherein, based on a difference between the output from the first source follower transistor and the output from the second source follower transistor in the second mode, a difference between a threshold voltage for the first follower transistor and a threshold voltage for the second source follower transistor is compensated for.

5. The image sensor according to claim 3, wherein, when the light incident amount is relatively high, the noise signal from the second source follower transistor in the second mode is adopted.

6. An image sensor including a plurality of pixels arranged in a matrix, the image sensor comprising:
   a vertical scan circuit configured to sequentially control operation of the plurality of pixels row by row; and
   an analog-to-digital converter configured to perform analog-to-digital conversion by receiving readout signals for each column from the plurality of pixels, wherein
   each of the pixels includes:
      a photodiode configured to generate an output voltage corresponding to a light incident amount;
      a reset transistor configured to reset the photodiode by supplying a reset voltage to the photodiode;
      a peak hold transistor that includes a control end connected to the photodiode and the reset transistor, and is configured to allow a current corresponding to the output voltage of the photodiode or the reset voltage to flow through the peak hold transistor; and
      a first capacitor and a second capacitor each configured to hold the current supplied from the peak hold transistor,
   each of the pixels includes, as operation modes:
      a first mode in which the output voltage of the photodiode immediately after the reset transistor is turned on to reset the photodiode is held in the first capacitor, and the output voltage of the photodiode after the photodiode is reset and a predetermined signal integration period ends is held in the second capacitor; and
      a second mode in which the output voltage of the photodiode in a state where the reset transistor is turned on to reset the photodiode is held in the first capacitor or the second capacitor,
   in the first mode, an image signal corresponding to the light incident amount of the photodiode and a noise signal when the light incident amount is relatively low are obtained,
   in the second mode, a noise signal when the light incident amount of the photodiode is relatively high is obtained, and
   the analog-to-digital converter removes the noise signal to obtain the image signal based on the signals supplied from the respective pixels of one row.

7. An image sensor including a plurality of pixels, wherein
   each of the pixels includes:
      a photodiode configured to generate an output voltage corresponding to a light incident amount;
      a reset transistor configured to reset the photodiode by supplying a reset voltage to the photodiode;

a peak hold transistor that includes a control end connected to the photodiode and the reset transistor, and is configured to allow a current corresponding to the output voltage of the photodiode or the reset voltage to flow through the peak hold transistor; and a first capacitor and a second capacitor each configured to hold the current supplied from the peak hold transistor, each of the pixels includes, as operation modes:

a first mode in which the output voltage of the photodiode immediately after the reset transistor is turned on to reset the photodiode is held in the first capacitor, and the output voltage of the photodiode after the photodiode is reset and a predetermined signal integration period ends is held in the second capacitor;

a third mode in which the output voltage of the photodiode in a state where the reset transistor is turned on to reset the photodiode is held in the second capacitor; and a fourth mode in which, during a period between the first mode and the third mode, charges accumulated in the first capacitor are refreshed into a predetermined value, and the output voltage of the photodiode is then held in the first capacitor, in the first mode, an image signal when the light incident amount of the photodiode is high and a noise signal when the light incident amount is relatively low are obtained, in the third mode, a noise signal when the light incident amount of the photodiode is relatively high is obtained, and in the fourth mode, an image signal when the light incident amount of the photodiode is low is obtained.

* * * * *